Oct. 4, 1966   R. B. JOHNS   3,276,350
MULTIPLE EGG COOKER

Filed Sept. 28, 1965   2 Sheets-Sheet 1

INVENTOR.
RUSSELL B. JOHNS
BY
Marshall, Wilson & Yeasting
-Attorneys-

Oct. 4, 1966

R. B. JOHNS 3,276,350

MULTIPLE EGG COOKER

Filed Sept. 28, 1965

INVENTOR.
RUSSELL B. JOHNS

BY Marshall, Wilson & Yeasting
Attorneys

United States Patent Office 3,276,350
Patented Oct. 4, 1966

3,276,350
MULTIPLE EGG COOKER
Russell B. Johns, Toledo, Ohio
Filed Sept. 28, 1965, Ser. No. 490,916
1 Claim. (Cl. 99—332)

This is a continuation-in-part of application Serial No. 383,737, filed July 20, 1964, now Patent No. 3,223,025.

The present invention relates to a multiple egg cooker for cooking a plurality of eggs simultaneously.

It is well known in the restaurant business that the frying of eggs is a relatively expensive operation because of the great amount of hand labor involved. During the frying of eggs the eggs must be watched very closely to avoid under cooking or over cooking, and the cooked eggs must be handled very carefully to preserve a good appearance and to avoid breaking the yolks.

Since the cooked eggs must be removed from the cooking plate carefully one at a time, it is difficult to control the duration of the cooking of several eggs simultaneously and it is impractical to cook more than a few eggs at one time.

The principal object of the invention is to provide a novel egg cooker in which a substantial number of eggs may be cooked simultaneously and then may be transferred simultaneously from the cooking pan to a serving pan, without separate handling of the eggs, while preserving a good appearance of the cooked eggs. More specific objects and advantages are apparent from the following description, in which reference is had to the accompanying drawings illustrating a preferred embodiment of the invention.

FIG. 1 of the drawings is a perspective view of a preferred form of multiple egg cooker embodying the invention.

Figure 3:
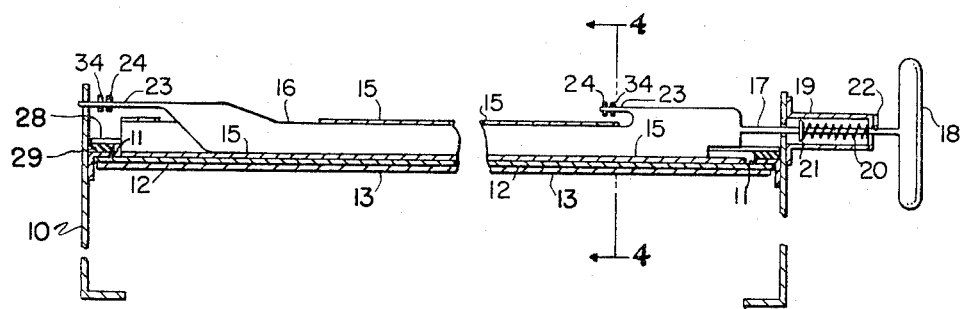
FIG. 3 is a vertical section taken on the line 3—3 of FIG. 2.
Figure 4:
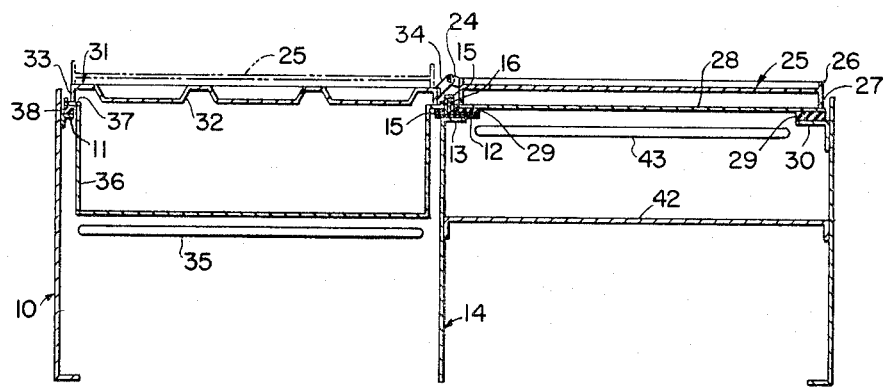
FIG. 4 is a vertical section taken on the line 4—4 of FIG. 3.

The multiple egg cooker shown in the drawings comprises a hollow rectangular frame 10 which preferably is made of stainless steel and which consists of four vertical walls. Extending inward near the upper edges of the front wall, the rear wall and one side wall of the frame 10 is a horizontal flange 11 (FIGS. 3 and 4). A relatively narrow horizontal plate 12 extends from front to back and is welded at both of its ends to the lower side of the horizontal flange 11. Welded in turn to the bottom of the horizontal plate 12 is a horizontal flange 13 which is formed on the upper end of a vertical partition 14 that extends from the front wall to the rear wall of the frame 10.

A bracket 15 has a central portion which is in the shape of a narrow inverted "U" and has horizontal flanges which extend from the lower edges of the central portion of the bracket and which are welded to the upper surface of the horizontal plate 12. Slidably enclosed in the inverted "U" shaped central portion of the bracket 15 is an elongated slide 16 having an integral stem 17 extending from its front end. The stem 17 extends through a hollow cap 19 which is welded to the front wall of the frame 10, and terminates in a thermally insulated handle 18. A compression spring 20 bears at one end against the inner surface of the cap 19 and at the other end against a collar 21 fixed on the stem 17. The compression spring 20 thus tends to hold the slide 16 in its rearward position in which a lug 22 formed on the stem 17 bears against the outer end of the cap 19.

The slide 16 is provided with two slender horizontal extensions 23, each of which, when the slide 16 is in its rearward position, extends through a hinge 24 which is integral with an aluminum serving pan 25 (FIG. 4). The upper surface of the serving pan 25 is surrounded by an upstanding flange 26, and the lower surface is surrounded by a depending flange 27 by means of which the serving pan may be supported upon a removable rectangular aluminum plate 28. The four edges of the aluminum plate 28 rest upon four strips of thermal insulation 29, one of which is supported by one of the horizontal flanges of the bracket 15, two of which are supported by the horizontal flange 11 which extends inward near the upper edges of the front and rear walls of the rectangular frame 10, and one of which rests upon another horizontal flange 30 which extends inward near the upper edge of one of the side walls of the rectangular frame 10.

An aluminum cooking pan 31 is provided with a plurality of depressions 32 in which raw eggs to be cooked may be deposited, and is surrounded by a depending flange 33. The cooking pan 31 has a pair of integral hinges 34 through which the slender extensions 23 of the slide 16 extend when the slide is in its rearward position.

An electrical heating element 35, located below the cooking pan 31, supplies the heat for the cooking operation. Although the heat for the cooking operation may be radiated directly from the electrical heating element 35, it is highly advantageous to cook the eggs by means of steam generated in a water pan 36 that is heated by means of the electrical heating element 35. Surrounding the upper edge of the water pan 36 is a horizontal flange 37 by means of which the water pan is supported upon four strips of thermal insulating material 38, three of which rest upon the flange 11 that extends inward near the upper edges of the vertical walls of the rectangular housing 10, and one of which rests upon one of the horizontal flanges of the bracket 15.

Before the operation of cooking the eggs is begun, the serving pan 25 is swung upon its hinges 24 through an angle of 180° to bring the serving pan into the dotted line position shown in FIG. 4. When in this position, the serving pan 25 acts as a cover to prevent steam from escaping from the cooking pan 31. The steam generated in the water pan 36 enters the space between the cooking pan 31 and the inverted serving pan 25 through a number of small apertures 39 which are distributed throughout the area of the cooking pan 31.

Figure 2:
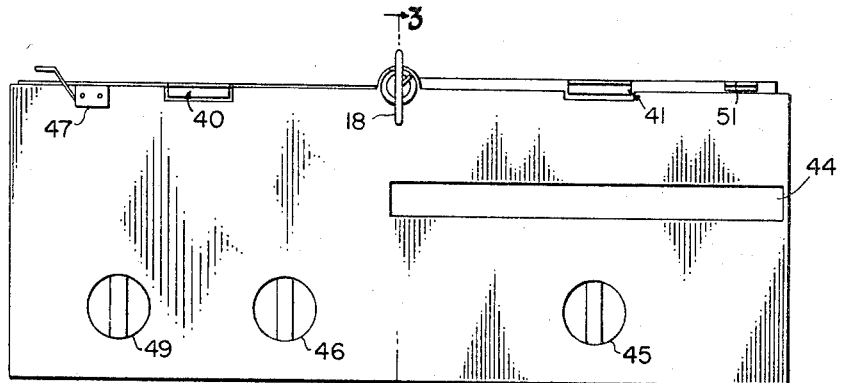
FIG. 2 is a front view of the egg cooker.

The cooking pan 31 is provided with a handle 40 and the serving pan 25 is provided with a similar handle 41, the front wall of the rectangular frame 10 being suitably notched to receive the handles 40 and 41 (FIG. 2). Each of the handles 40 and 41 is substantially flat on its upper side and is covered on its lower side with thermal insulating material. When the serving pan 25 is in the inverted position shown in dotted lines in FIG. 4, the flat surfaces of the handles 40 and 41 are in contact with one another, and the thermally insulated surfaces of the handles are outermost, so that the operator can grasp both of the handles 40 and 41 in one hand, being protected from burning by the thermal insulation on the outermost sides of the handles.

An important feature of the present invention resides in the fact that the serving pan 25, when in its inverted position as shown in dotted lines in FIG. 4, has a substantially flat surface that lies closely adjacent to the upper surface of the cooking pan 1. The benefits of this arrangement arise at the end of the cooking operation. At that time, the operator grasps the two handles 40 and 41 in one hand, thus holding the inverted serving pan 25 and the cooking pan 31 tightly together, and rotates the two pans simultaneously through an angle of 180° so as to bring the serving pan back to the normal position in which it is shown in full lines in FIG. 4 while inverting the cooking pan 31 on top of the serving pan. During this operation, the fact that the flat surface of the serving pan 25 lies closely adjacent to the upper surface of the cooking pan 31 is important because the cooked eggs are thus prevented from sliding out of the depressions 32 while the two pans are being rotated through an angle of 180°. Then when the serving pan reaches the position in which it is shown in full lines in FIG. 4, the cooking pan is inverted on top of the serving pan so that the cooked eggs are gently transferred from the cooking pan to the serving pan.

The fact that the surface of the serving pan 25, unlike the surface of the cooking pan 31, is flat and free from depressions is also important, because the flat surface of the serving pan 25 makes it possible to remove the cooked eggs from the serving pan by means of a spatula much more quickly and conveniently than they could be removed from the depressions in the upper surface of the cooking pan 31. Once the cooked eggs have been transferred to the serving pan 25, the hinges 24 of the serving pan 25 may be quickly disengaged by pulling forward on the handle 18 so as to free the hinges 24 from the extensions 23 of the slide 16. The operator then may carry the serving pan 25 to another location, and may replace the serving pan 25 with an identical empty pan.

It will be understood that the hinges 34 of the cooking pan 31 also may be disengaged by pulling forward on the handle 18, so that the cooking pan 31 also may be carried to another location, and may be replaced by an identical cooking pan which already has been prepared by depositing raw eggs in the depressions 32.

The depressions 32 which are formed in the cooking pan 31 are important because they hold the cooked eggs in position while the cooking pan and the serving pan are being swung through an angle of 180° to bring the cooking pan on top of the serving pan. Another advantage of the depressions 32 is that they give a relatively attractive symmetrical form to the cooked eggs. The novel construction which permits the two pans to be swung through an angle of 180° at the end of the cooking operation to deposit the cooked eggs upon the serving pan makes it possible to cook the eggs in depressions. Without this arrangement for transferring the eggs from the cooking pan to the serving pan, it would not be practical to cook the eggs in depressions because it would be too difficult to remove the eggs from depressions by means of a spatula.

The simultaneous transfer of the cooked eggs from the relatively hot cooking pan to the relatively cool serving pan in the manner hereinbefore described insures that all the eggs will be cooked to the same degree. The cooking pan is quite hot at the end of the cooking operation, so that it would be impossible to cook all the eggs to the same degree if it were necessary to remove the eggs manually one at a time from the cooking pan.

At the end of the cooking operation, if the cooked eggs which have been transferred to the serving pan 25 are not needed immediately, and if it is desired to proceed with the cooking of another batch of eggs, the serving pan 25 upon which the cooked eggs have been deposited may be disengaged by drawing the handle 18 forward and may then be placed upon a shelf 42 which is provided in the frame 10. The serving pan containing the cooked eggs which has been placed upon the shelf 42 may then be replaced by an identical empty serving pan 25.

Preferably an electrical warming element 43 is mounted in the frame 10 in such a position that it extends below the aluminum plate 28 and above the holding shelf 42. The warming element 43 radiates heat both upward and downward so as to keep warm a serving pan located in the position shown in solid lines in FIG. 4 or a serving pan resting on the holding shelf 42. A slot 44 is provided in the front wall of the rectangular frame 10 in order to permit a serving pan to be inserted upon the holding shelf 42.

The upper surfaces of the pans 25 and 31 preferably are coated with one of the known materials (such as Teflon) which are commonly used to coat aluminum frying pans in order to prevent food from sticking thereto.

In order to control the temperature of the warming element 43, a rheostat 45 is provided on the front of the frame 10. A similar rheostat 46 on the front of the frame 10 controls the temperature of the heating element 35 during the cooking operation.

Figure 1:
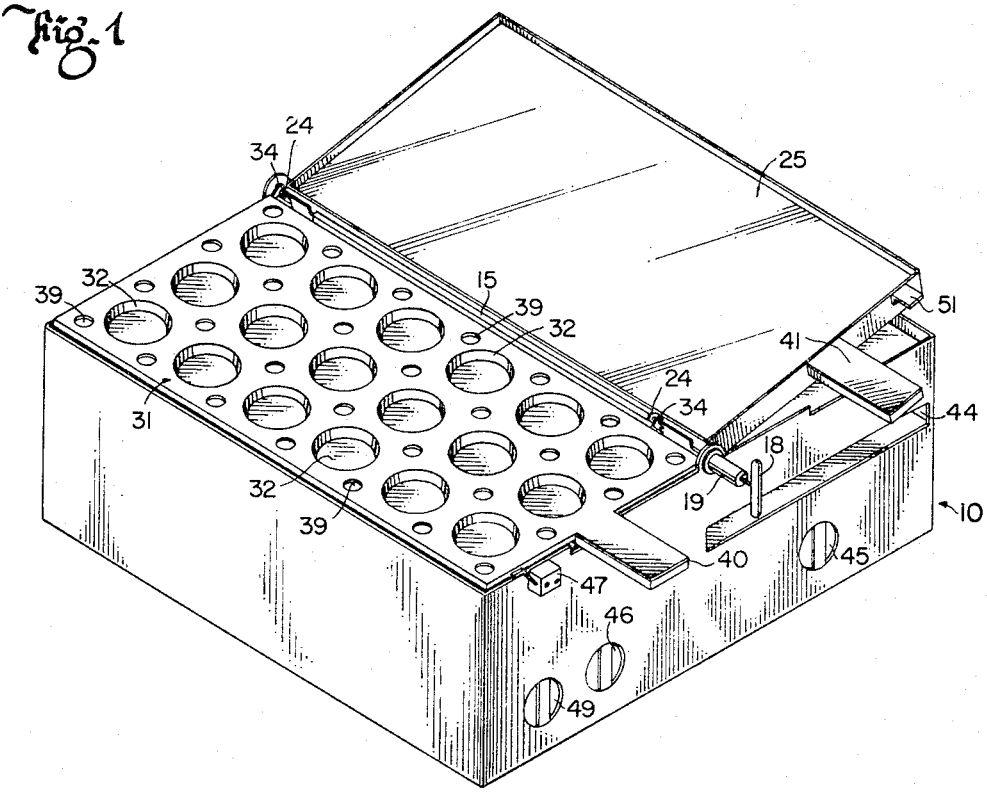
Figure 5:
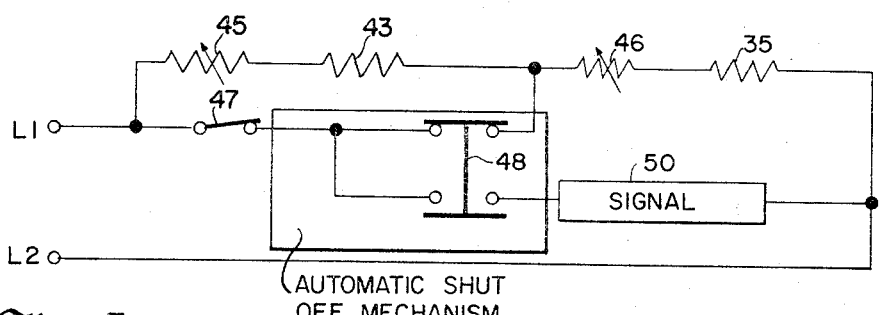
FIG. 5 is a wiring diagram.

As indicated in the wiring diagram of FIG. 5, the heating element 35 and the rheostat 46 are connected in series with the warming element 43 and the rheostat 45. When the apparatus is standing idle before the commencement of a cooking operation, the switch 47 is open so that current flows in series through the heating element 35 and the warming element 43.

The operation of the heating element 35 may be controlled in substantially the same manner as the operation of the heating element in an electric toaster. Preferably the switch 47 is so arranged that movement of the switch 47 to its closed position at the beginning of a cooking operation resets a control switch 48 to the position shown in FIG. 5. In this reset position of the control switch 48, the upper contacts of the control switch complete a circuit through the electrical heating element 35, bypassing the warming element 43. Closing of the control switch starts a suitable cooking timer 49 which is located on the front of the frame 10 and which is adjustable to determine the timed duration of the cooking operation.

When the timer 49 times out, it causes the control switch 48 to move to its raised position, thus opening the upper contacts of the control switch through which power is supplied directly to the heating element 35 and closing the lower contacts of the control switch to energize a signal 50 consisting of a buzzer or a warning light.

As soon as the operator observes the energization of the signal 50, he opens the switch 47. The opening of the upper contacts of the control switch 48 at the end of the timed interval forces the current again to flow in series through the warming element 43 and the heating element 35 so as to terminate the cooking operation.

Preferably the control switch 47 is arranged on the front wall of the frame 10 as indicated in FIG. 2, in such a position that the control switch 47 is contacted by a tab 51 on the serving pan 25 and is thereby closed whenever the serving pan 25 is inverted on top of the cooking pan 31. With this arrangement, the control switch 47 automatically closes at the beginning of each cooking operation when the operator swings the serving pan into position to cover the cooking pan 31, and automatically opens when the operator swings the cooking pan and the serving pan together to invert the cooking pan on top of the serving pan.

The circuit shown in FIG. 5 operates in such a manner that during the cooking operation the full line voltage is applied to the electrical heating element 35 and rheostat 46 to generate sufficient heat to boil the water in the water pan 36. At the termination of each cooking operation, when the timer times out to move switch 48 to its raised position, the current again flows in series through the warming element 43 and the heating element 35 to maintain the temperature of the water in the water pan 36 just below the boiling point.

It has been found that the use of steam to perform the cooking operation in the present cooker produces excellent results in that the cooked eggs are very uniform in quality and attractive in appearance. If direct heating is employed, the egg tend to dry out during cooking and cannot be kept warm for more than a few minutes without rendering them unpalatable. The steam-cooked eggs produced in the cooker shown in the drawings, on the other hand, remain attractive and palatable even when kept warm for a relatively long period of time.

One of the most important applications of the present cooker is in the cooking of eggs for use in sandwiches. Many restaurants which do a large volume of business, particularly in sandwiches, have been unable to serve egg sandwiches because they have had no equipment for cooking eggs in substantial numbers at low cost.

The cooking pan 31 may be provided with depressions 32 of the proper size and shape to prepare cooked eggs for use in sandwiches. A substantial supply of such cooked eggs may be prepared before the lunch hour, and the present cooker may be used to prepare additional quantities as they are required. In preparing eggs for use in sandwiches, the yolk is broken as each egg is placed in one of the depressions 32, so that the resulting cooked egg is flat and thus in proper form for use as a sandwich filler.

Having described the invention, I claim:

A multiple egg cooker comprising, in combination, a cooking pan, a serving pan, a frame for supporting the cooking pan and the serving pan side by side, hinge members having aligned apertures, for connecting the cooking pan and the serving pan at their adjacent edges, comprising at least two sets of mating hinge members, each such set consisting of at least one hinge member secured to the cooking pan and at least one hinge member secured to the serving pan, a hinge pin support slidably mounted in the frame for movement parallel to the axis of alignment of the apertures in the hinge members, outboard hinge pins carried by such support, each of which is receivable in the apertures of one set of mating hinge members, the sets of mating hinge members being spaced apart far enough to permit the hinge pins to be withdrawn completely from the sets of hinge members, an operating handle connected to the hinge pin supports, the hinge pin support being movable by the operating handle between a position in which the hinge pins are withdrawn from the apertures in the hinge members and a positioin in which the hinge pins are received in the apertures to connect the two pans and to serve as a pivot upon which each of the pans may be turned through an angle of substantially 180° in order to invert either pan on top of the other, the serving pan having a substantially flat upper surface which, when the serving pan is inverted on top of the cooking pan, lies closely adjacent to the upper surface of the cooking pan, an electrical heating element for supplying heat to the cooking pan, a switch for supplying current to the electrical heating element, and automatic shutoff mechanism for opening the switch to shut off the supply of heat after a delay period during which cooking of the eggs takes place.

References Cited by the Examiner

UNITED STATES PATENTS

| | | | |
|---|---|---|---|
| 316,741 | 4/1885 | Carpenter | 99—424 |
| 411,619 | 9/1889 | Shaeffer | 99—424 |
| 1,410,818 | 3/1922 | McCargar | 99—424 |
| 1,678,690 | 7/1928 | Connell | 99—377 |
| 1,957,133 | 5/1934 | Davis | 99—424 |
| 2,804,009 | 5/1957 | Holland | 99—234 |
| 3,223,025 | 12/1965 | John | 99—377 |

FOREIGN PATENTS 654,971  1/1938  Germany.

WALTER A. SCHEEL, *Primary Examiner.*

BILLY J. WILHITE, *Examiner.*